US012736468B2

(12) United States Patent
Cheng et al.

(10) Patent No.: US 12,736,468 B2
(45) Date of Patent: Sep. 15, 2026

(54) LAYERED DETECTION METHOD AND LAYERED DETECTION SYSTEM

(71) Applicant: Advanced ACEBIOTEK CO., LTD., Hsinchu County (TW)

(72) Inventors: Ting Cheng, Taipei City (TW); Yung-Chou Hsu, New Taipei City (TW); Hui-Shun Kuan, Taipei City (TW); Jyh-Chern Chen, New Taipei City (TW); Chan-Shan Yang, Taipei City (TW); Shen-Fu Hsu, Taitung County (TW)

(73) Assignee: Advanced ACEBIOTEK CO., LTD., Hsinchu County (TW)

( * ) Notice: Subject to any disclaimer, the term of this patent is extended or adjusted under 35 U.S.C. 154(b) by 103 days.

(21) Appl. No.: 18/885,738

(22) Filed: Sep. 15, 2024

(65) Prior Publication Data

US 2025/0383284 A1 Dec. 18, 2025

(30) Foreign Application Priority Data

Jun. 18, 2024 (TW) ................................ 113122521

(51) Int. Cl.

*G01N 21/00* (2006.01)
*G01N 21/3563* (2014.01)
*G01N 21/3581* (2014.01)
*G01N 21/95* (2006.01)

(52) U.S. Cl.

CPC ..... *G01N 21/3581* (2013.01); *G01N 21/3563* (2013.01); *G01N 21/9501* (2013.01)

(58) Field of Classification Search

CPC ............... G01N 21/3581; G01N 21/95; G01N 21/9505; G01N 21/3563

See application file for complete search history.

(56) References Cited

U.S. PATENT DOCUMENTS

2015/0211934 A1 7/2015 Van Mechelen
2015/0316475 A1 11/2015 Rahman
2021/0356394 A1* 11/2021 Wallace ................ G01N 21/55

FOREIGN PATENT DOCUMENTS

CN 106525862 A 3/2017
CN 118111998 A 5/2024
JP 2013-4578 A 1/2013
JP 2023-88011 A 6/2023
TW 202144763 A 12/2021

* cited by examiner

*Primary Examiner* — Dani Fox
(74) *Attorney, Agent, or Firm* — Winston Hsu

(57) ABSTRACT

A layered detection method comprises generating a terahertz emission electromagnetic wave, and emitting the terahertz emission electromagnetic wave at any angle to a solid material; detecting a plurality of terahertz emission electromagnetic waves reflected or transmitted after the terahertz emission electromagnetic wave is incident on the solid material and passes through an entire thickness of the solid material in a first direction; measuring and analyzing a plurality of characteristic signals according to the terahertz emission electromagnetic wave and the plurality of terahertz reception electromagnetic waves, to distinguish the solid material along the first direction into a plurality of parallel layers, and determine a plurality of characteristics of the plurality of layers; and determining at least one defect information of each layer of the plurality of layers according to the plurality of characteristics of the plurality of layers.

20 Claims, 15 Drawing Sheets

LAYERED DETECTION METHOD AND LAYERED DETECTION SYSTEM

BACKGROUND OF THE INVENTION

1. Field of the Invention

The present invention relates to a layered detection method and layered detection system, and more particularly, to a layered detection method and layered detection system enabling non-contact and non-destructive detection of non-transparent solid materials.

2. Description of the Prior Art

Semiconductor wafers, ceramics, and polymer materials are mostly insulators or semiconductors and are widely used in various fields, including electronics, construction, aerospace, chemical, and medical industries. The physical properties of these solid materials, such as mechanical properties, thermal properties, and optoelectronic properties, are all indicators to evaluate whether the material is suitable for use, and the product quality of the product after the material is processed into a product is also mostly determined by these physical properties. In the incoming inspection of raw materials or the functional verification stage of semi-finished and finished products, several key parameters are usually selected as the standard for passing or not passing.

Common mechanical properties of materials include Vickers hardness, fracture toughness, bending strength, and modulus of elasticity. Thermal properties include coefficient of thermal expansion, thermal conductivity, and specific heat capacity. Optoelectronic properties include refractive index, dielectric constant, and conductivity to describe these parameters. In addition, the thickness, warpage, and surface roughness of the solid materials are also important reference properties. However, the prior art methods for measuring the above parameters involve applying force, high temperature, voltage, etc. to the sample surface, or bending and deforming the sample, and will all come into contact with the sample and cause a certain degree of damage.

On the other hand, the existence of defects inside the material is also an evaluation indicator. Common internal defects include crystallographic defects, microcracks, porosity, and residual stress. Traditional inspection methods usually use techniques such as scanning electron microscope (SEM), transmission electron microscope (TEM), or X-ray diffraction (XRD), which are not only expensive and time-consuming, but can also mostly only detect the sample surface and cannot detect multiple parameters at the same time.

To detect defects below the surface of the sample, existing technologies such as optical coherence tomography (OCT), total internal reflection fluorescence microscopy (TIRFM), and scanning acoustic microscopy (SAM) are mature, but have high limitations on the materials to be tested, such as not being able to test low-light scattering materials or opaque materials; or even if they can be tested, they will encounter the problem of insufficient resolution. Therefore, there is a need to improve the prior art.

SUMMARY OF THE INVENTION

Therefore, the present invention is to provide a layered detection method and layered detection system to enable non-destructive detection for non-transparent solid materials.

An embodiment of the present invention discloses a layered detection method, which comprises generating a terahertz emission electromagnetic wave, and emitting the terahertz emission electromagnetic wave at any angle to a solid material; detecting a plurality of terahertz emission electromagnetic waves reflected or transmitted after the terahertz emission electromagnetic wave is incident on the solid material and passes through an entire thickness of the solid material in a first direction; measuring and analyzing a plurality of characteristic signals according to the terahertz emission electromagnetic wave and the plurality of terahertz reception electromagnetic waves, to distinguish the solid material along the first direction into a plurality of parallel layers, and determine a plurality of characteristics of the plurality of layers; and determining at least one defect information of each layer of the plurality of layers according to the plurality of characteristics of the plurality of layers.

Another embodiment of the present invention discloses a layered detection system, which comprises a terahertz electromagnetic wave generator, configured to generate a terahertz emission electromagnetic wave, and emit the terahertz emission electromagnetic wave at any angle to a solid material; a terahertz electromagnetic wave receiver, configured to detect a plurality of terahertz emission electromagnetic waves reflected or transmitted after the terahertz emission electromagnetic wave is incident on the solid material and passes through an entire thickness of the solid material in a first direction; and a detection device, coupled to the terahertz electromagnetic wave generator and the terahertz electromagnetic wave receiver, configured to measure and analyze a plurality of characteristic signals according to the terahertz emission electromagnetic wave and the plurality of terahertz reception electromagnetic waves, to distinguish the solid material along the first direction into a plurality of parallel layers, and determine a plurality of characteristics of the plurality of layers, and to determine at least one defect information of each layer of the plurality of layers according to the plurality of characteristics of the plurality of layers.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Semiconductor wafers, ceramics, and polymers undergo multiple processes during the manufacturing process. The high-temperature processes (such as sintering and annealing) and mechanical-physical processes (such as grinding, polishing, pulverization, and compression) involved in these processes can all cause defects inside the materials. In order to ensure that the physical properties of these materials meet the requirements, appropriate inspection methods must be taken during the production and manufacturing process. However, most non-destructive inspection methods can only detect the surface, and the methods for detecting the inside of the material almost need to destroy the sample. Therefore, how to effectively analyze whether there are abnormalities inside the material in a non-contact and non-destructive manner has become one of the goals that the industry is striving for. In such a situation, the present invention uses terahertz electromagnetic waves to achieve non-contact and non-destructive detection. Terahertz electromagnetic waves operate in the frequency range of $10^{11}$ Hz to $10^{13}$ Hz (0.1 THz to 10 THz, allowing through non-conductive materials and measurement of highly water-containing substances. The advantage of terahertz detection is that it has good penetration for many materials, and can be used to detect the optical coefficient, electrical properties, layer thickness or structural defects of different materials and structures inside the test specimen. It can also be used for technical inspection in the process, semi-finished or finished product inspection. When terahertz electromagnetic waves are used to detect the test specimen, because the frequency of terahertz electromagnetic waves is much lower than that of infrared waves (ranging from $10^{13}$ Hz to $10^{15}$ Hz), the energy of the photons carried by terahertz electromagnetic waves is smaller, and the molecular structure will not be destroyed, so that the structural integrity can be maintained, and the damage or defects will not be further expanded, which can greatly reduce the probability of destructive testing of finished products.

Figure 1:
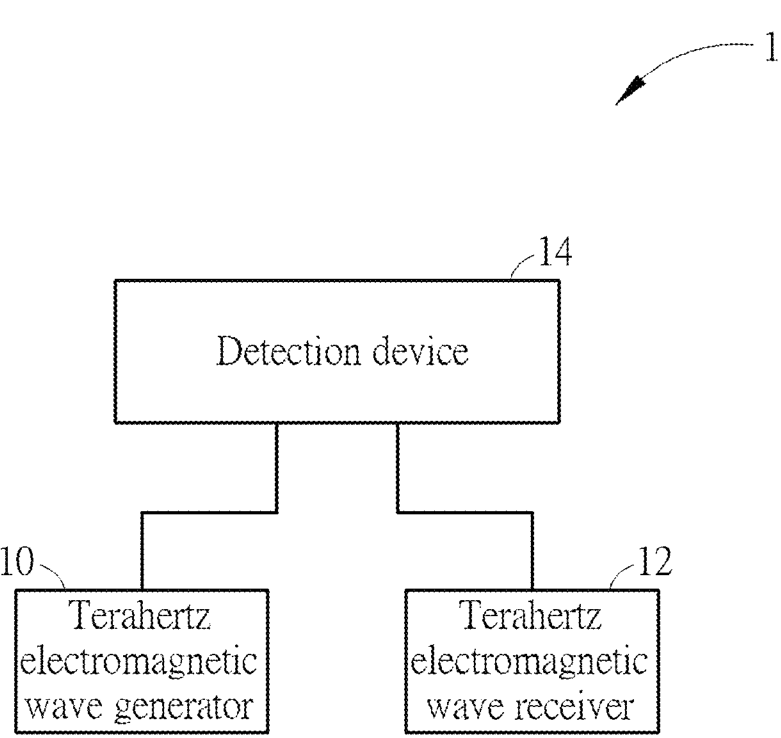
FIG. 1 is a functional block diagram of a layered detection system according to an embodiment of the present invention.

Specifically, please refer to FIG. 1, which is a functional block diagram of a layered detection system 1 according to an embodiment of the present invention. The layered detection system 1 comprises a terahertz electromagnetic wave generator 10, a terahertz electromagnetic wave receiver 12, and a detection device 14, which can detect the internal structure of a solid material. More specifically, the layered detection system 1 can perform layered detection for the inside of the solid material, and the solid material may be selected from one or more of a semiconductor wafer, a ceramic material, and a polymer material. The semiconductor wafer may be at least one of a silicon wafer (Si), a germanium wafer (Ge), a silicon carbide (Sic), a gallium arsenide (GaAs), a gallium nitride (GaN), a gallium phosphide (GaP), a cadmium sulfide (CdS), an indium phosphide (InP), a zinc oxide (ZnO), a gallium oxide ($Ga_2O_3$), and an aluminum nitride (AlN). The terahertz electromagnetic wave generator 10 is used to generate a terahertz emission electromagnetic wave, which is incident on the solid material at any angle. The terahertz electromagnetic wave receiver 12 is used to detect a plurality of terahertz reception electromagnetic waves reflected or transmitted after the terahertz emission electromagnetic wave is incident on the solid material and passes through the overall thickness of the solid material in a first direction. The detection device 14 is coupled to the terahertz electromagnetic wave generator 10 and the terahertz electromagnetic wave receiver 12, and is used to measure and analyze a plurality of characteristic signals based on the terahertz emission electromagnetic wave and the plurality of terahertz reception electromagnetic waves, so as to distinguish the solid material into a plurality of parallel layers along the first direction, and to determine a plurality of characteristics of the plurality of layers, and thereby to determine at least one defect information of each layer. The first direction is the normal direction to the interfaces of the plurality of layers.

In short, the detection device 14 may divide the solid material into multiple layers to analyze the properties of each layer, and thereby determine the defect situation inside the solid material, such as material inhomogeneity, bubbles or porosity, uneven mixing of multiple materials, residual stress, crystal dislocation, uneven doping concentration, etc. The relevant principles are explained as follows.

Figure 2:
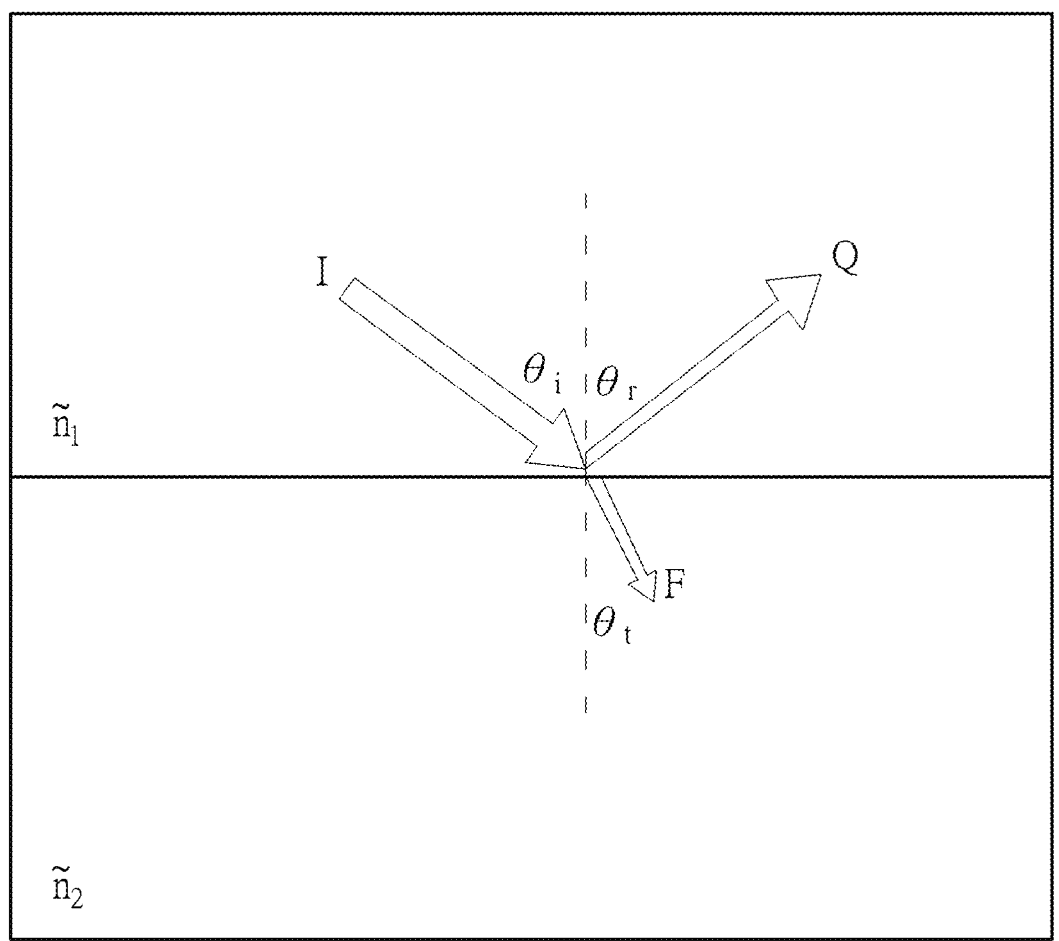
FIG. 2 is a schematic diagram of reflection and refraction when electromagnetic waves propagate in a medium.

Please refer to FIG. 2, which is a schematic diagram of reflection and refraction when electromagnetic waves propagate in a medium. As shown in FIG. 2, an incident electromagnetic wave I is incident from a first medium with a complex refractive index my into a second medium with a complex refractive index $\tilde{n}_2$. A portion of the electromagnetic wave is reflected at the interface of the media, denoted as Q, and another portion is refracted, denoted as F. Suppose that the angles between the incident electromagnetic wave I, the reflected electromagnetic wave Q, and the refracted electromagnetic wave F and the normal to the interface of the first and second media are $\theta_i$, $\theta_r$, and $\theta$, respectively. The relationship between the incident angle $\theta_i$ and the reflection angle $\theta_r$ can be obtained from the law of reflection: $\theta_i=\theta_r$. The relationship between the incident angle $\theta_i$ and the refraction angle $\theta_t$ can be obtained from Snell's Law:

$$\frac{\sin\theta_i}{\sin\theta_t} = \frac{\tilde{n}_2}{\tilde{n}_1}. \qquad \text{(Eq. 1)}$$

The ratio of the incident electromagnetic wave I reflected by the interface of the media is defined as the reflectance R, and the ratio of the refracted electromagnetic wave is called the transmittance T, and the relationship between the two is: T=1−R (Eq. 2).

The specific forms of the reflectance and the transmittance are also related to the polarization of the incident electromagnetic wave I. If the electric field component of the polarized incident electromagnetic wave I is perpendicular to the plane formed by the incident electromagnetic wave I and the reflected electromagnetic wave Q, then the state of the incident electromagnetic wave I is called "s polarization state"; on the contrary, if the electric field component of the polarized incident electromagnetic wave I is parallel to the plane formed by the incident electromagnetic wave I and the reflected electromagnetic wave Q, then the state of the incident electromagnetic wave I is called "p polarization state". Based on Fresnel's equations, for the s-polarized incident electromagnetic wave I, the reflectance is:

$$\widetilde{R_s} = \frac{\widetilde{E_{rs}}}{\widetilde{E_{\iota s}}} = \left[\frac{\sin(\theta_t - \theta_i)}{\sin(\theta_t + \theta_i)}\right]^2 = \left(\frac{\tilde{n}_1 \cos \theta_i - \tilde{n}_2 \cos \theta_t}{\tilde{n}_1 \cos \theta_i + \tilde{n}_2 \cos \theta_t}\right)^2; \quad \text{(Eq. 3)}$$

for the p-polarized incident electromagnetic wave I, the reflectance is:

$$\widetilde{R_p} = \frac{\widetilde{E_{rp}}}{\widetilde{E_{\iota p}}} = \left[\frac{\tan(\theta_t - \theta_i)}{\tan(\theta_t + \theta_i)}\right]^2 = \left(\frac{\tilde{n}_1 \cos \theta_t - \tilde{n}_2 \cos \theta_i}{\tilde{n}_1 \cos \theta_t + \tilde{n}_2 \cos \theta_i}\right)^2; \quad \text{(Eq. 4)}$$

where $\widetilde{E_{\iota s}}$ and $\widetilde{E_{rs}}$ respectively represent the electric field intensities of the s-polarized incident electromagnetic wave I and the reflected electromagnetic wave Q, respectively, and $\widetilde{E_{\iota p}}$ and $\widetilde{E_{rp}}$ respectively represent the electric field intensities of the p-polarized incident electromagnetic wave I and the reflected electromagnetic wave Q.

Based on the above equations, the detection device 14 may distinguish the interior of the solid material into multiple layers and determine the characteristics of each layer, thereby determining the defect information of each layer. The detection device 14 is not limited to a specific technique for determining the characteristics of each layer. For example, the applicant has provided a composite structure detection method and a composite structure detection system in U.S. patent application Ser. No. 18/813,045, which can be appropriately adjusted and applied to the present invention. For example, in one embodiment, the detection device 14 may compare the signal of the terahertz emission electromagnetic wave detecting the air with the signal of the terahertz emission electromagnetic wave detecting the solid material, analyze the time-domain optical spectrum and frequency-domain optical spectrum to measure the characteristic signals, and further analyze the refractive index, dielectric constant, conductivity, doping concentration, etc. of each layer of the solid material, and may also analyze the structure and defects of each layer inside the solid material or provide a basis for determining defects. The defects may be, for example, material inhomogeneity (e.g., bubbles, uneven mixing of multiple materials), lattice dislocations, uneven doping concentration, etc. Specifically, the detection device 14 may measure the transient electric field of each terahertz reception electromagnetic wave in the time domain to obtain the electric field intensity, electric field phase, and electric field frequency of the transient (time-domain) electric field, and applies transformation (e.g., Fourier transforms) to obtain the spectral electric field between terahertz reception electromagnetic waves to obtain the electric field amplitude, electric field polarization, and electric field phase of the spectral electric field. That is, the characteristic signals measured by the detection device 14 may include the transient electric field intensity and phase of each terahertz reception electromagnetic wave in the time domain, as well as the spectral electric field amplitude, polarization and phase between the terahertz reception electromagnetic waves in the frequency domain. Since the characteristic signals (transient electric field intensity and phase, as well as spectral electric field amplitude, polarization, and phase) are very sensitive to material properties, the optical coefficients of the material (such as absorptance, refractive index, reflectivity, or transmittance, etc.), electrical coefficients (such as conductivity, resistivity, doping concentration, dielectric constant, and charge carrier mobility, etc.), and structural characteristics may be directly measured by calculating physical formulas. On the other hand, the detection device 14 may measure the time of flight of the plurality of terahertz reception electromagnetic waves and analyze the time of flight to determine the thickness of each layer inside the solid material. In this way, the detection device 14 may analyze whether the structure between layers is abnormal, the position of components is abnormal, the thickness is as designed, and the stress changes, etc., based on the time-domain time-of-flight spectrum signal, and may also be used to determine whether the process technology is incorrect or whether the component is a defective product.

Therefore, by comparing the signal of the terahertz emission electromagnetic wave detecting the air (or metal plate, highly conductive material, etc.) with the signal of detecting the solid material, the detection device 14 may measure the plurality of characteristic signals related to the solid material, and thereby determine the characteristics of the plurality of layers of the solid material. The characteristic signals may include the electric field intensity and electric field phase of the time-domain electric field of each terahertz reception electromagnetic wave, and/or the electric field amplitude and electric field phase of the spectral electric field between the terahertz reception electromagnetic waves. The characteristics of each layer may include at least one of the thickness of each layer, the optical coefficient, the electrical coefficient, the structural state, the resistance, and the stress change. The electrical coefficient may be at least one of conductivity, resistivity, doping concentration, dielectric constant, and charge carrier mobility, and the optical coefficient may be at least one of absorptance, refractive index, reflectivity, and transmittance. Accordingly, the detection device 14 may further determine whether the solid material contains defects or provide a basis for verifying defects.

It should be noted that the above Eq. 1 to Eq. 4 are the basis for the layered operation of the detection device 14 in the layered detection system 1. The operation method for performing detection after the detection device 14 completes the layered operation is not limited to the composite structure detection method and composite structure detection system disclosed in the aforementioned U.S. patent application Ser. No. 18/813,045. It may be various methods or systems for detection using electromagnetic waves. For example, the applicant has provided a semiconductor wafer detection method and a semiconductor wafer detection device in Taiwanese Patent No. I788105, which uses terahertz electromagnetic waves to detect the characteristics of a plurality of interface layers of a semiconductor wafer, and may also be appropriately adjusted and applied to the present invention.

Figure 3:
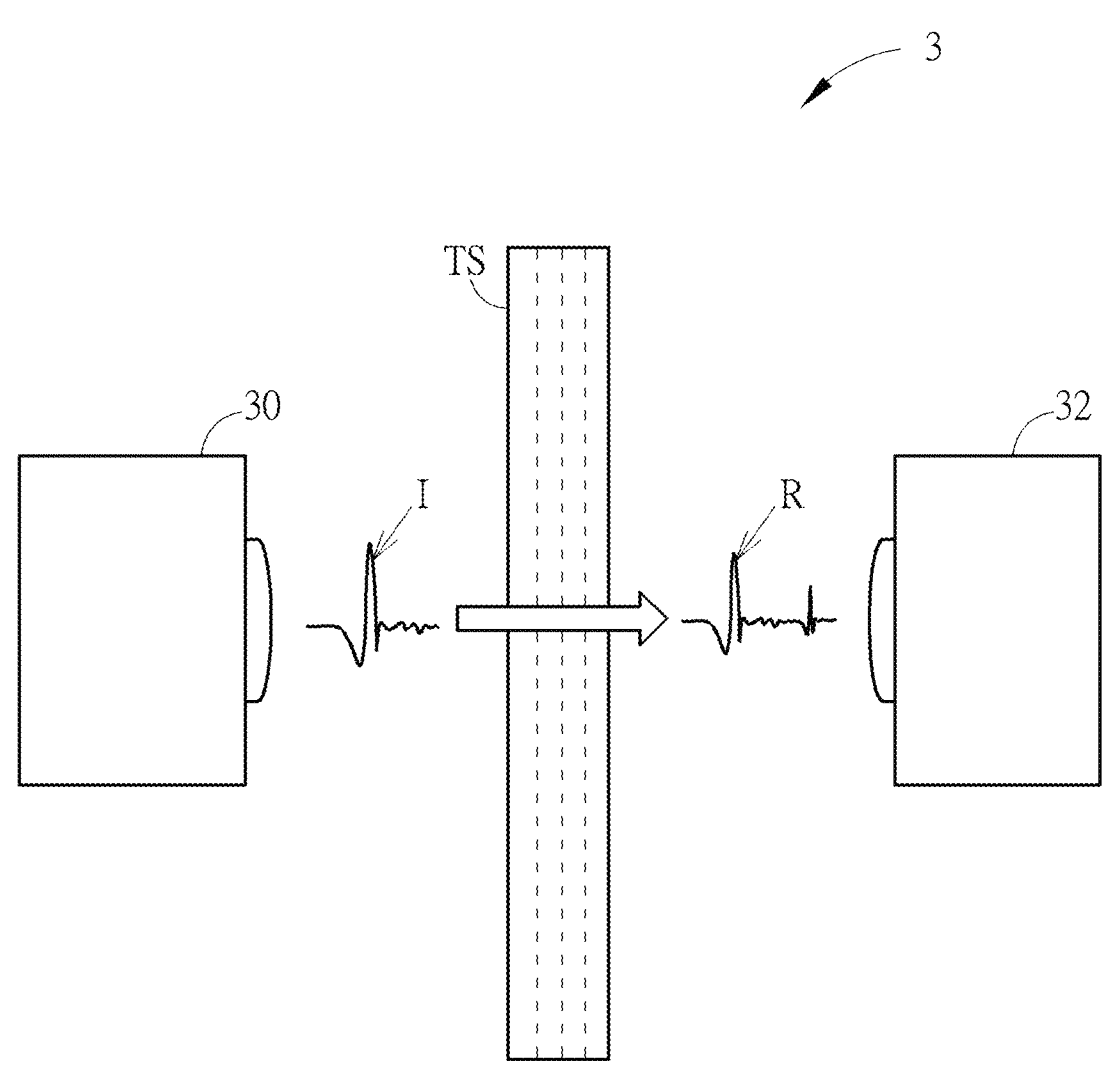
FIG. 3 is a schematic diagram of a layered detection system according to an embodiment of the present invention.

In addition, the layered detection system 1 shown in FIG. 1 is represented by functional blocks, which are essential components in the implementation of the present invention. However, when implementing the layered detection system 1, those skilled in the art may design or choose an appropriate architecture based on practical requirements. For example, FIG. 3 is a schematic diagram of a layered detection system 3 according to an embodiment of the present invention. The layered detection system 3 is derived from the layered detection system 1 and adopts a transmission-based terahertz electromagnetic wave detection architecture. For simplicity, FIG. 3 omits the specific position of the detection device 14, which can be inferred from FIG. 1 by those skilled in the art. In detail, the layered detection system 3 uses a terahertz electromagnetic wave generator 30 to generate a terahertz emission electromagnetic wave I, which is incident on a test specimen TS (e.g., the solid material). The terahertz electromagnetic wave receiver 32 detects a plurality of terahertz reception electromagnetic waves R that are transmitted through the test specimen TS after the terahertz emission electromagnetic wave I is incident thereon. It should be noted that the layering in the test specimen TS is used to represent the relationship between the results of the layered calculations performed by the detection device 14 and the terahertz emission electromagnetic wave I or the terahertz reception electromagnetic waves R, rather than to represent that the structure of the test specimen TS itself includes a layered structure.

Figure 4A:
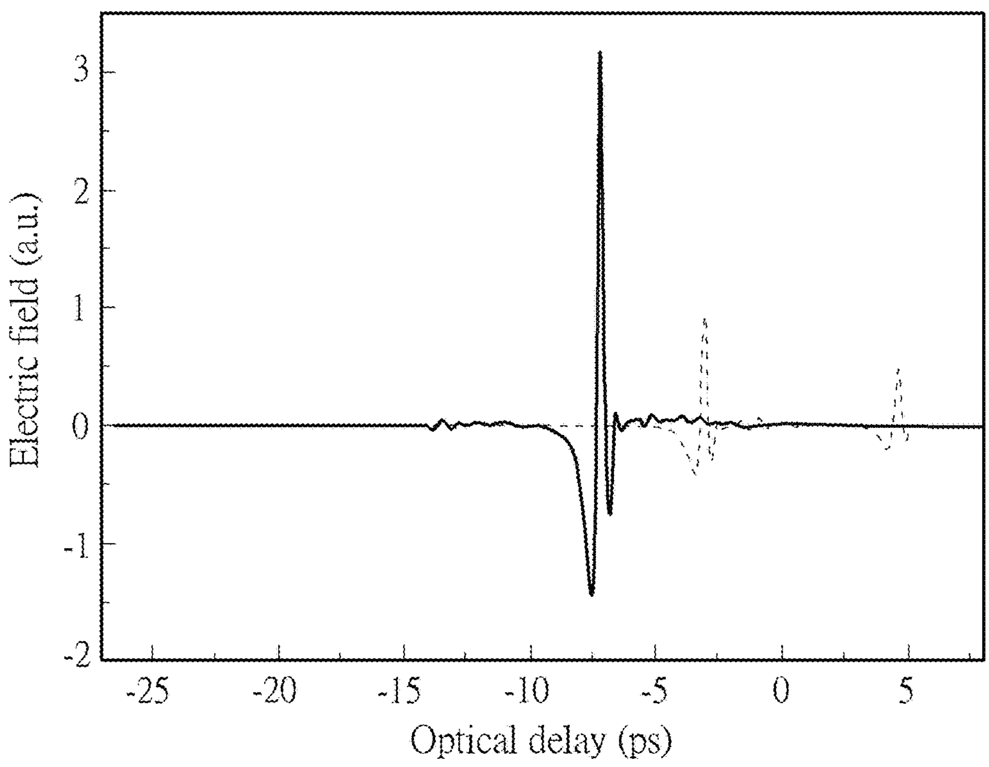
FIG. 4A and FIG. 4B are schematic diagrams of the time-domain optical spectrum and frequency-domain optical spectrum detected by the layered detection system shown in FIG. 3, respectively.
Figure 4B:
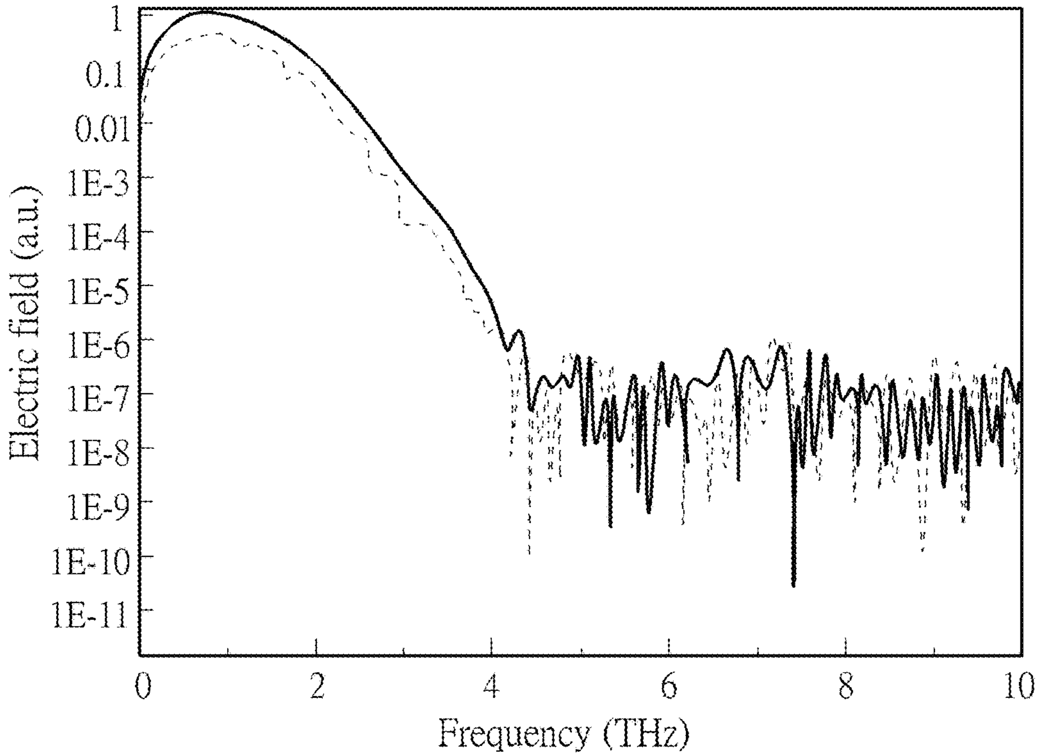

The layered detection system 3 utilizes a transmission-based terahertz electromagnetic wave detection architecture, which may compare the signal of the terahertz emission electromagnetic wave detecting the air with the signal of detecting the solid material, analyze the time-domain and frequency-domain optical spectra, and measure the characteristic signals. For example, please refer to FIG. 4A and FIG. 4B, which are schematic diagrams of the time-domain optical spectrum and frequency-domain optical spectrum detected by the layered detection system 3, respectively. In FIG. 4A, the solid line represents the result of the electric field against optical delay (time-domain optical spectrum) of the terahertz emission electromagnetic wave detecting the air (without setting the solid material to be tested), and the dotted line represents the result of the electric field against optical delay (time-domain optical spectrum) of the terahertz emission electromagnetic wave detecting the solid material; in FIG. 4B, the solid line represents the result of the electric field against the frequency spectrum (frequency-domain optical spectrum) of the terahertz emission electromagnetic wave detecting the air (without setting the solid material to be tested), and the dotted line represents the result of the electric field against the frequency spectrum (frequency-domain optical spectrum) of the terahertz emission electromagnetic wave detecting the solid material. Therefore, by analyzing the time-domain optical spectrum and frequency-domain optical spectrum, the detection device 14 of the transmission detection architecture may measure the characteristic signals, and further analyze and obtain the refractive index, dielectric constant, conductivity, doping concentration, etc. of each layer of the solid material, and may also analyze the internal structure of the solid material and whether there are defects or provide a basis for judging defects. The defects may be, for example, material inhomogeneity (e.g., bubbles, uneven mixing of multiple materials), lattice dislocations, uneven doping concentration, etc.

In addition, since the layered detection system 3 is a transmission architecture, that is, the terahertz reception electromagnetic waves received by the terahertz electromagnetic wave receiver 32 are the transmission results after the incident electromagnetic wave I passes through the entire thickness of the solid material, the detection device 14 may define a specific depth in the solid material as an interface, and obtain the electric field intensity of the incident electromagnetic wave I and the refracted electromagnetic wave F corresponding to this interface, and their respective angles $\theta_i$ and $\theta_t$ with the normal to the incident point, and, through Eq. 1 to Eq. 4 (or their derived equations), the complex refractive indices (i.e., $\tilde{n}_1$, $\tilde{n}_2$) of the media (layers) on both sides of this interface can be obtained; repeating this process, different interfaces at different depths can be defined, and the complex refractive indices of the media (layers) on both sides of each interface can be obtained, which means that the interior of the solid material is layered. In this way, the layered detection system 3 may divide the solid material into arbitrary layers according to the needs of the operator, and further determine the characteristics of each layer and whether there are defects.

Figure 5:
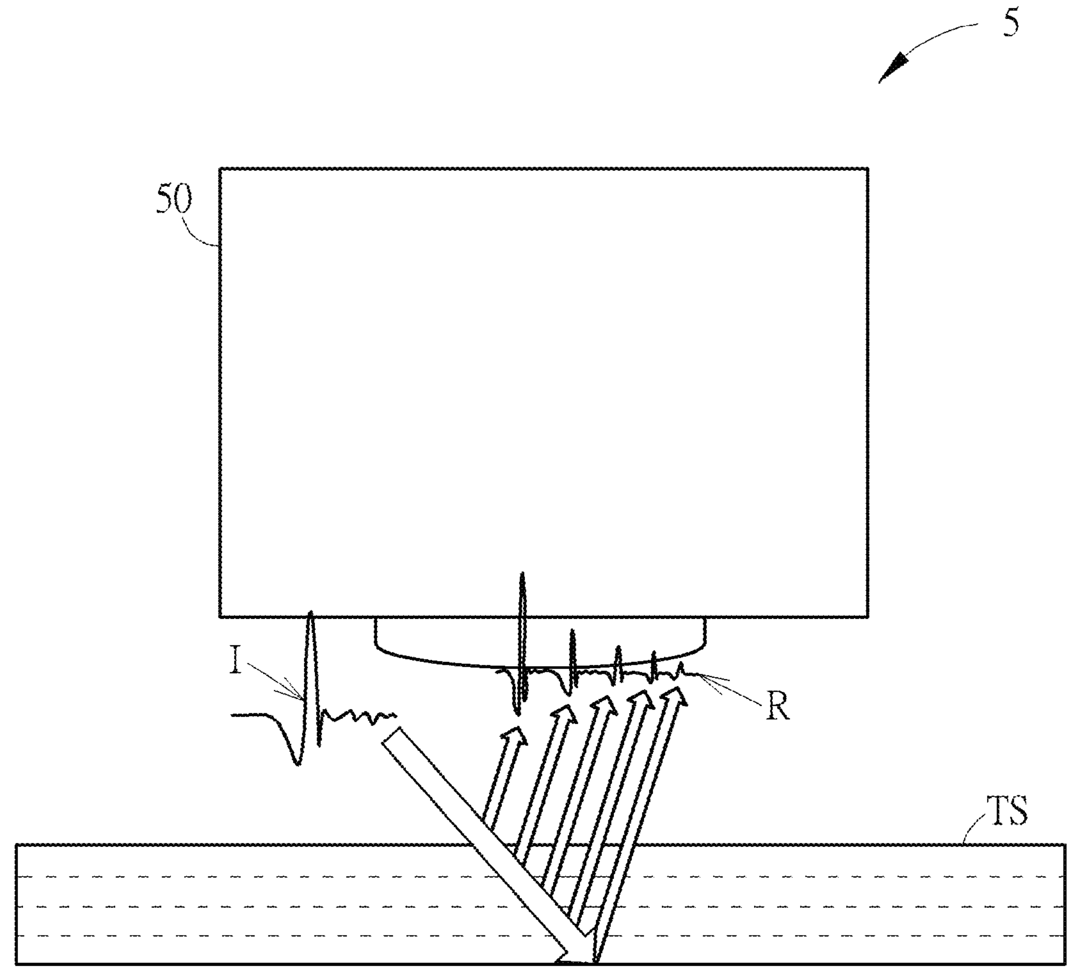
FIG. 5 is a schematic diagram of a layered detection system according to an embodiment of the present invention.

On the other hand, please refer to FIG. 5, which is a schematic diagram of a layered detection system 5 according to an embodiment of the present invention. The layered detection system 5 is derived from the layered detection system 1 and adopts a reflection-based terahertz electromagnetic wave detection architecture. For simplicity, FIG. 5 omits the specific location of the detection device 14, which can be inferred from FIG. 1 by those skilled in the art. Specifically, the layered detection system 5 adopts a reflective detection structure, in which a terahertz electromagnetic wave generator and receiver 50 integrates the functions of terahertz electromagnetic wave emission and reception; that is to say, the terahertz electromagnetic wave generator and receiver 50 may generate the terahertz emission electromagnetic wave I, emit the terahertz emission electromagnetic wave I onto the test specimen TS (such as the solid material), and detect the plurality of terahertz reception electromagnetic waves R reflected by the test specimen TS after the terahertz emission electromagnetic wave I is incident thereon. In addition, the operation method of the layered detection system 5 can refer to the aforementioned operation methods of the layered detection systems 1 and 3.

Figure 6A:
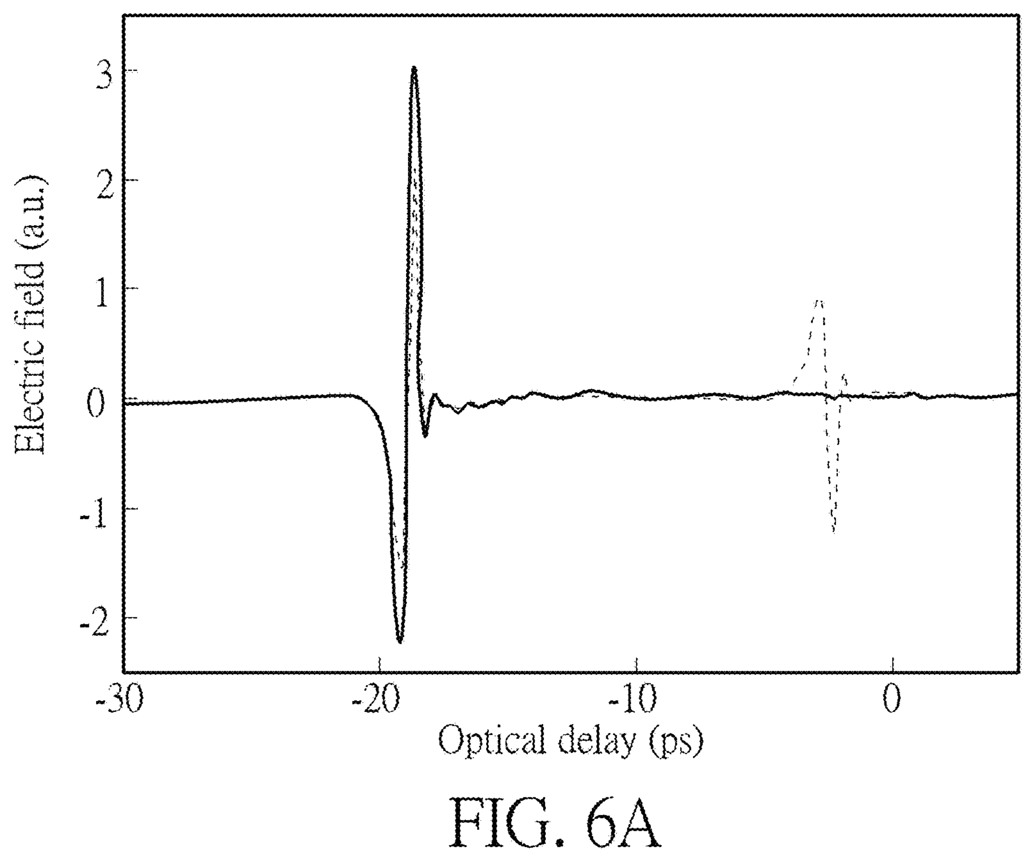
FIG. 6A and FIG. 6B are schematic diagrams of the time-domain and frequency-domain optical spectra detected by the layered detection system shown in FIG. 5, respectively.
Figure 6B:
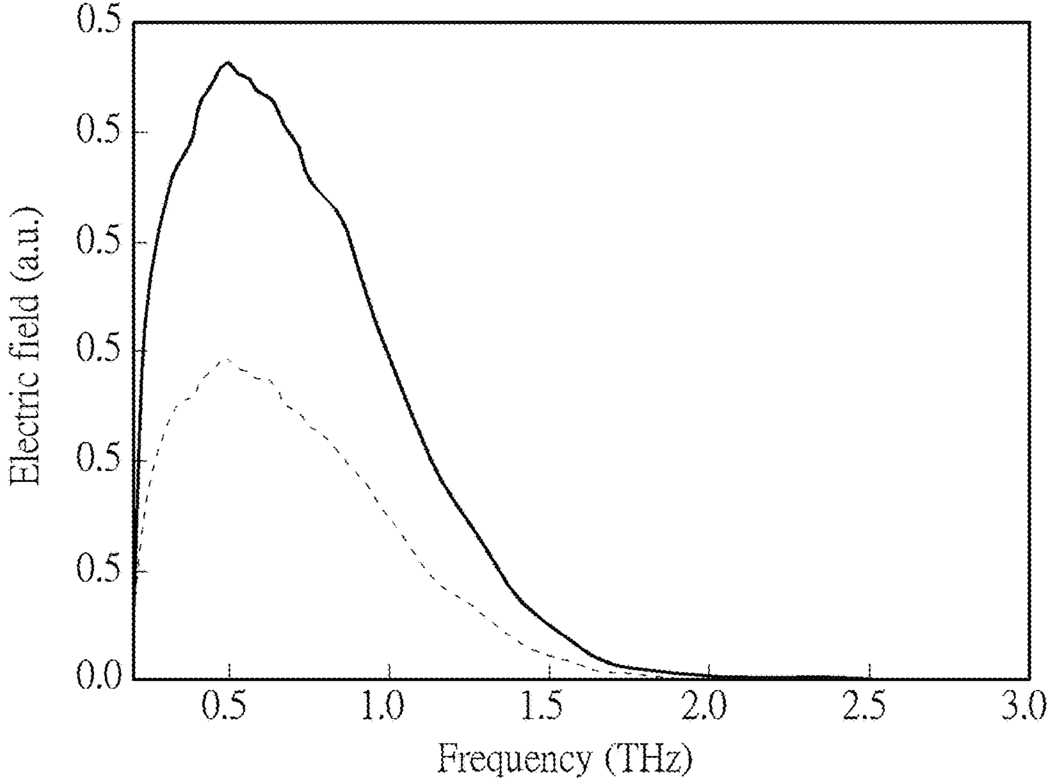

Further, please refer to FIG. 6A and FIG. 6B, which are schematic diagrams of the time-domain and frequency-domain optical spectra detected by the layered detection system 5, respectively. In FIG. 6A, the solid line represents the result of the electric field against optical delay (time-domain optical spectrum) of the terahertz emission electromagnetic wave detecting the metal plate or highly conductive material, and the dotted line represents the result of the electric field against optical delay (time-domain optical spectrum) of the terahertz emission electromagnetic wave detecting the solid material; in FIG. 6B, the solid line represents the result of the electric field against the frequency spectrum (frequency-domain optical spectrum) of the terahertz emission electromagnetic wave detecting the metal plate or highly conductive material, and the dotted line represents the result of the electric field against the frequency spectrum (frequency-domain optical spectrum) of the terahertz emission electromagnetic wave detecting the solid material. Therefore, by analyzing the time-domain optical spectrum and frequency-domain optical spectrum, the detection device 14 of the reflective detection architecture may measure the characteristic signals, and further analyze and obtain the refractive index, dielectric constant, conductivity, doping concentration, etc. of each layer of the solid material, and may also analyze the internal structure of the solid material and whether there are defects or provide a basis for verifying defects. The defects may be, for example, material inhomogeneity (e.g., bubbles, uneven mixing of multiple materials), lattice dislocations, uneven doping concentration, etc.

In addition, since the layered detection system 5 is a reflective architecture, that is, the terahertz reception electromagnetic waves received by the terahertz electromagnetic wave generator and receiver 50 are the reflection results after the incident electromagnetic wave I passes through the entire thickness of the solid material, the detection device 14 may define a specific depth in the solid material as an interface, and obtain the electric field intensity of the incident electromagnetic wave I and the reflected electromagnetic wave Q corresponding to this interface, and their respective angles $\theta_i$ and $\theta_r$ with the normal to the incident point, and, through Eq. 1 to Eq. 4 (or their derived equations), the complex refractive indices (i.e., $\tilde{n}_1$, $\tilde{n}_2$) of the media (layers) on both sides of this interface can be obtained; repeating this process, different interfaces at different depths can be defined, and the complex refractive indices of the media (layers) on both sides of each interface can be obtained, which means that the interior of the solid material is layered. In this way, the layered detection system 5 may divide the solid material into arbitrary layers according to the needs of the operator, and further determine the characteristics of each layer and whether there are defects.

It should be noted that the layered detection systems 3 and 5 adopt transmission and reflection terahertz electromagnetic wave detection architectures derived from the layered detection system 1. A person skilled in the art should choose an appropriate structure based on actual needs or the items to be tested, and is not limited thereto. Generally speaking, the transmission terahertz electromagnetic wave detection architecture can directly penetrate the solid material to obtain the information about the overall phase difference and signal intensity difference, while the reflection terahertz electromagnetic wave detection architecture can reflect a signal when penetrating the interface between each layer, so it may return one or a plurality of terahertz waves. From these signals, the structure plane distribution and thickness change of each layer can be analyzed, as well as its material parameters, such as the refractive index, dielectric constant, conductivity, doping concentration, stress, etc.

FIG. 4A, FIG. 4B, FIG. 6A, and FIG. 6B illustrate the results of single-point detection of the solid material by the layered detection systems 3 and 5. Next, the application scenarios of layered detection are described.

Figure 7:
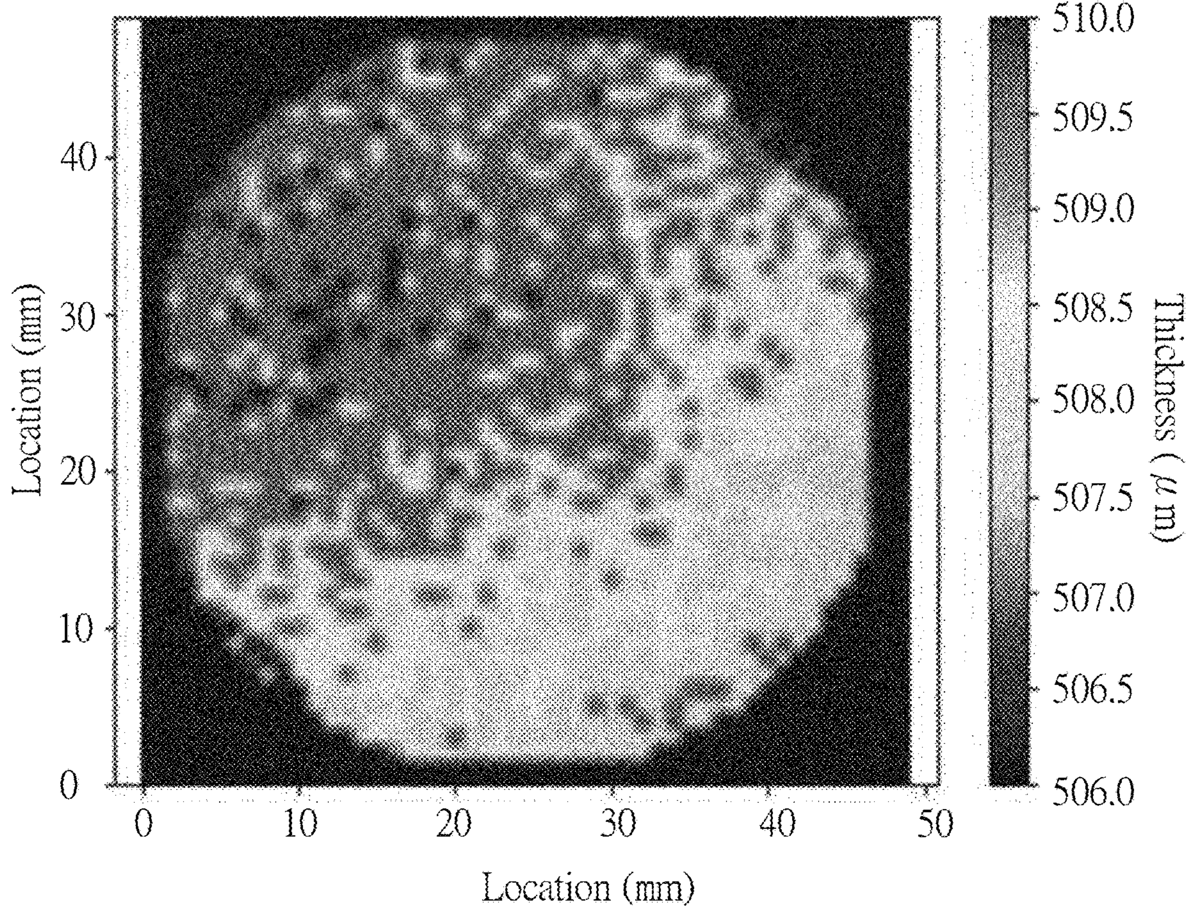
FIG. 7 is a schematic diagram of an entire scanning result of a sample.

As mentioned above, the embodiments of the present invention are applicable to the detection of various solid materials. For example, in one embodiment, the solid material may be a bare wafer. In general, a semiconductor wafer is called a bare wafer/substrate before it undergoes integrated circuit-related processes. Bare wafers go through various manufacturing processes from the raw material stage, such as crystal growth, slicing, grinding, etching, annealing, and polishing, to become bare wafers with quality assurance, and then are made into semiconductor wafers or products. When the embodiment of the present invention (such as the layered detection systems 1, 3, 5) is applied to the detection of bare wafers, it can perform single-point detection on the bare wafers and obtain results similar to those shown in FIG. 4A, FIG. 4B, FIG. 6A, and FIG. 6B. In addition, the embodiment of the present invention may also detect the entire sample in a scanning mode by moving the detector or the sample stage, and obtain scanning results as shown in FIG. 7. Based on these results, the signals of each region of the sample can be observed to determine whether the thickness is correct, the distribution of surface warpage, internal inhomogeneity, or other structural defects. However, in some applications, even if the wafer is subjected to overall detection, such as thermal conductivity, bending strength, and thickness, it may still not be possible to observe the internal differences of the wafer. In this case, the layered detection systems 1, 3, 5 of the present invention may perform layered calculations on the solid material based on the Fresnel equation and its derived algorithms, and further obtain various physical parameters of each layer. That is to say, the layering method of the solid material of the present invention is not limited by the actual structure of the solid material, but can be layered according to the number of layers, the thickness of each layer, etc., and different layering calculations may be performed on the same solid material in different detection procedures. For example, in a detection procedure, the embodiment of the present invention may not perform layered calculations on the wafer, that is, perform a full-thickness detection. If the detection results at this time cannot reflect the internal structural differences of the wafer, then the embodiment of the present invention may start another detection procedure to perform layered calculations on the same wafer, such as dividing/distinguishing it into two layers to detect the characteristics of these two layers. If the detection results at this time are still not sufficient to reflect the internal structural differences of the wafer, then the detection procedure can be performed again and divided into more layers for calculation. At the same time, when performing layered calculations, the thickness of each layer can be arbitrarily specified according to different analysis purposes, and is not limited to specific rules.

Figure 8:
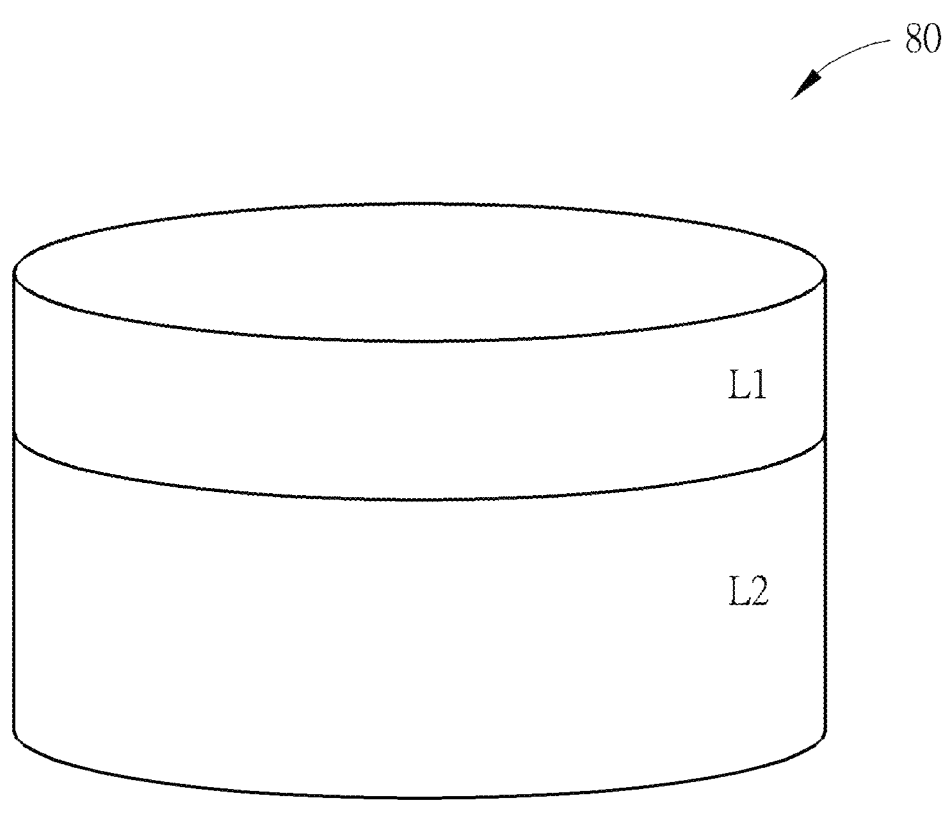
FIG. 8 is a schematic diagram of a wafer.
Figure 9A:
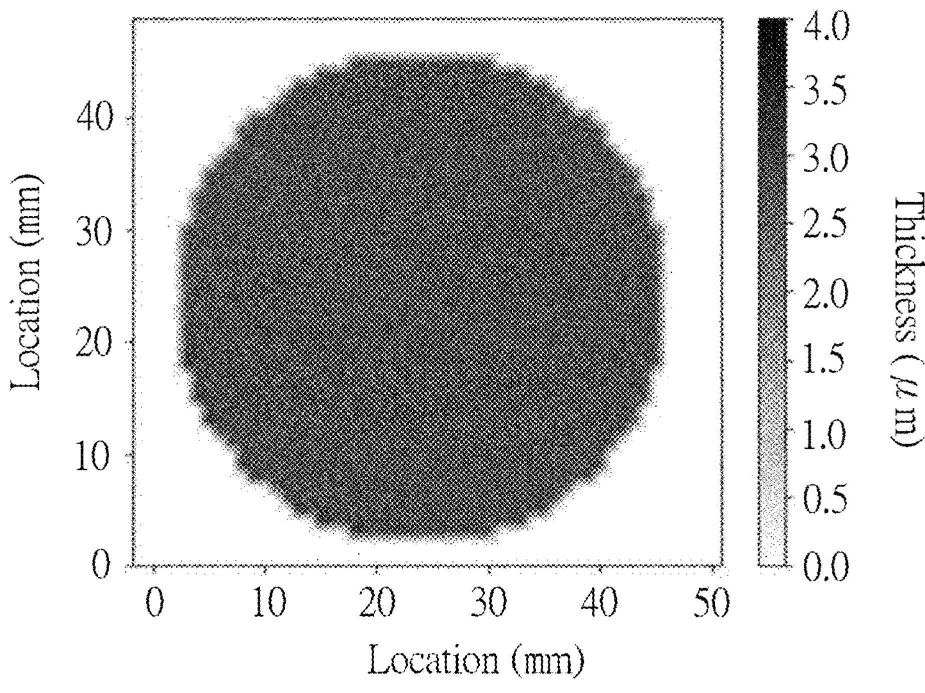
FIG. 9A is a schematic diagram of a refractive index distribution chart obtained without layering calculation of the wafer shown in FIG. 8.
Figure 9B:
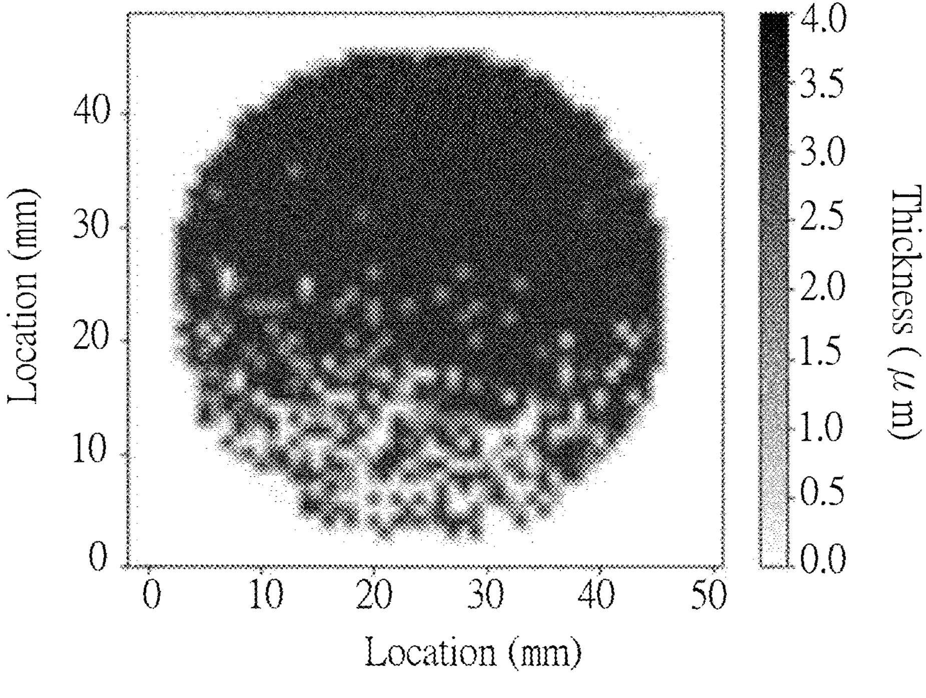
FIG. 9B is a schematic diagram of a refractive index distribution chart obtained through the layered detection system shown in FIG. 3.

By layering the interior of the wafer, the embodiment of the present invention may make a more accurate judgment on the internal structure of the wafer, and thus may judge the defect situation inside the wafer. For example, please refer to FIG. 8, which is a schematic diagram of a wafer 80. In one embodiment, in order to detect the structure of wafer 80, the operator uses the layered detection system 3 of FIG. 3, i.e., the transmission terahertz electromagnetic wave detection architecture, to detect the wafer 80, and obtains a refractive index distribution chart of the entire thickness of the wafer 80, as shown in FIG. 9A. That is to say, FIG. 9A is the refractive index distribution chart obtained without layering calculation of the wafer 80, and from this, it is impossible to distinguish whether there is regional inhomogeneity in the wafer 80. Next, in order to more accurately detect the structure of the wafer 80, the operator may perform layered calculations on the wafer 80 through the layered detection system 3, for example, distinguishing/dividing the wafer 80 into layers L1 and L2, and setting the thickness of the layer L1 to 10 μm, and then obtaining a refractive index distribution chart of the interface (10 μm below the surface) of the layers L1 and L2 through the layered detection system 3, as shown in FIG. 9B. As can be seen from FIG. 9B, there is an obvious distribution inhomogeneity between the upper and lower halves of the wafer 80.

Comparing FIG. 9A and FIG. 9B, it can be seen that the overall analysis of the wafer 80 (i.e., unlayered analysis) cannot distinguish whether there is regional inhomogeneity in the wafer 80, but the refractive index distribution chart of 10 μm below the surface shows that there is obvious distribution inhomogeneity in the wafer 80. Therefore, the layered calculation and subsequent layered characteristic detection of the present invention can clearly reflect the internal structure and whether there are defects or provide a basis for judging defects.

Figure 10:
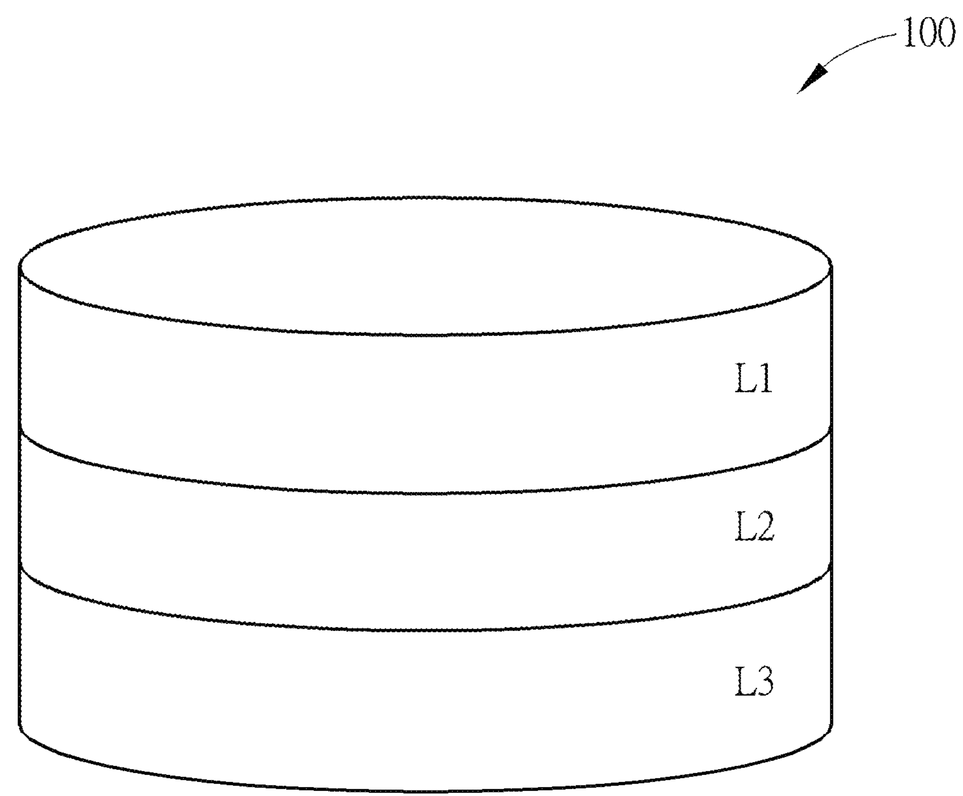
FIG. 10 is a schematic diagram of a wafer layering structure according to an embodiment of the present invention.

It should be noted that the items of layered characteristic detection of the present invention can be appropriately adjusted according to system requirements. For example, please refer to FIG. 10, which is a schematic diagram of a wafer layering structure 100. In one embodiment, in order to detect the structures of a first wafer and a second wafer, the operator uses the layered detection system 5 of FIG. 5, i.e., the reflective terahertz electromagnetic wave detection architecture, to respectively divide the first wafer and the second wafer into layers L1 to L3 according to the wafer layering structure 100, where the thickness of the layer L1 is 2 μm and the thickness of the layer L2 is 8 μm; that is, the total thickness of the layers L1 and L2 is 10 μm. After layering, the layered detection system 5 detects the first wafer and the second wafer separately, and obtains the test results as shown in FIG. 11A to FIG. 11C and FIG. 12A to FIG. 12C, where FIG. 11A is a refractive index distribution chart of the entire thickness of the first wafer, FIG. 11B is a refractive index distribution chart of the interface between the layers L2 and L3 (10 μm below the surface) of the first wafer, FIG. 11C is a refractive index distribution chart of the interface between the layers L1 and L2 (2 μm below the surface) of the first wafer, FIG. 12A is a refractive index distribution chart of the entire thickness of the second wafer, FIG. 12B is a refractive index distribution chart of the interface between the layers L2 and L3 (10 μm below the surface) of the second wafer, and FIG. 12C is a refractive index distribution chart of the interface between the layers L1 and L2 (2 μm below the surface) of the second wafer.

Figure 11A:
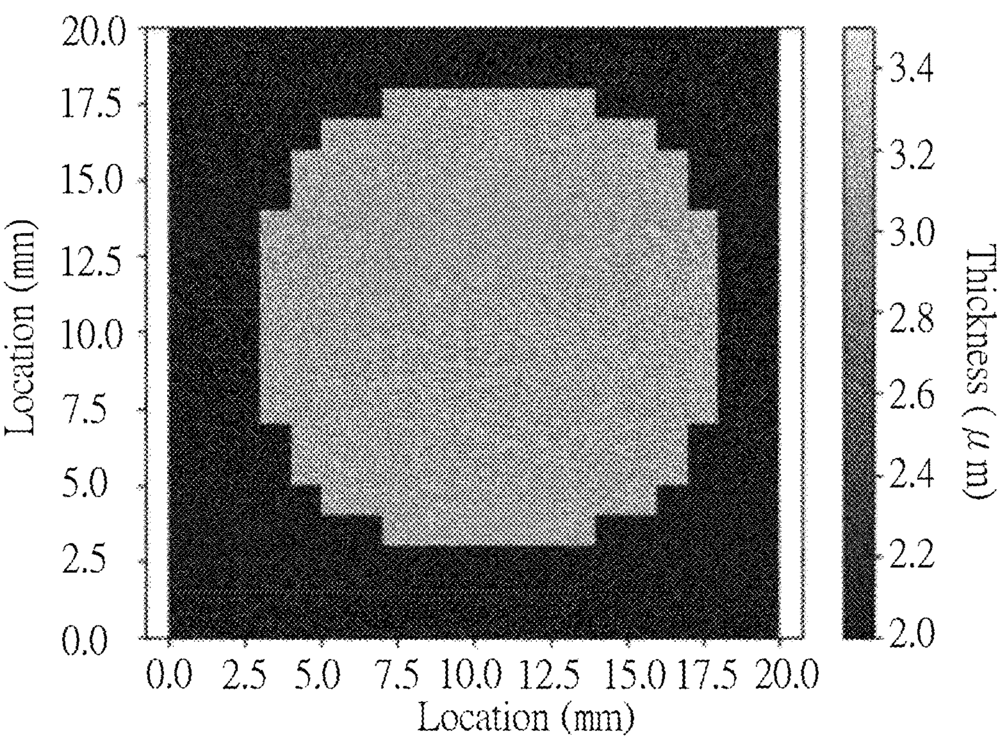
FIG. 11A, FIG. 11B and FIG. 11C are refractive index distribution charts of a first wafer.
Figure 11B:
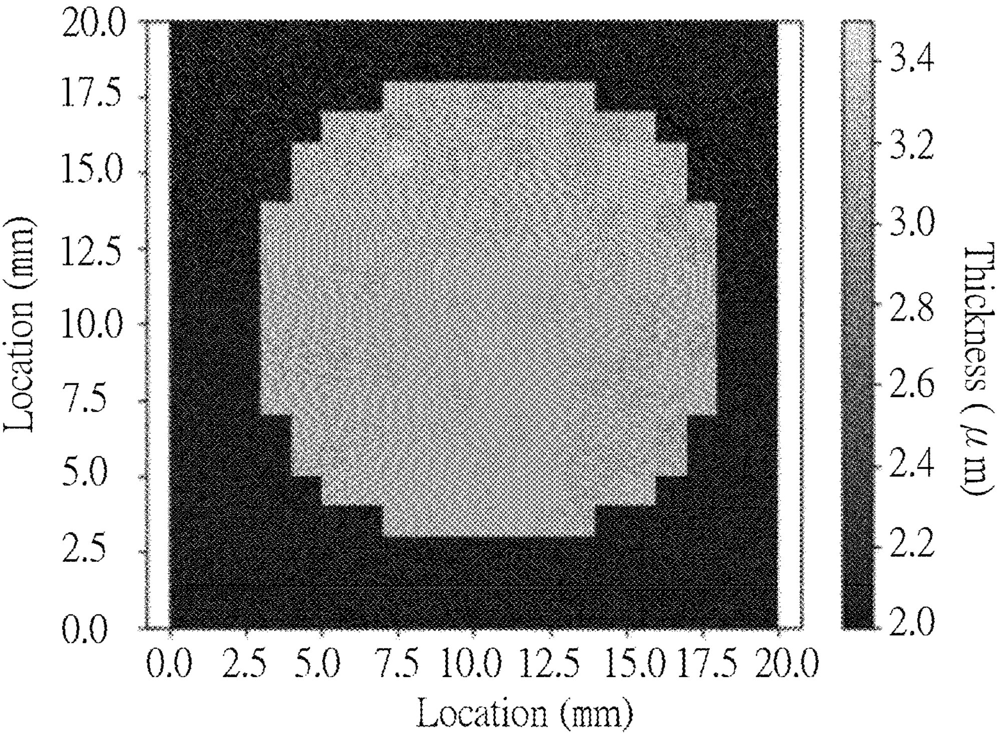
Figure 11C:
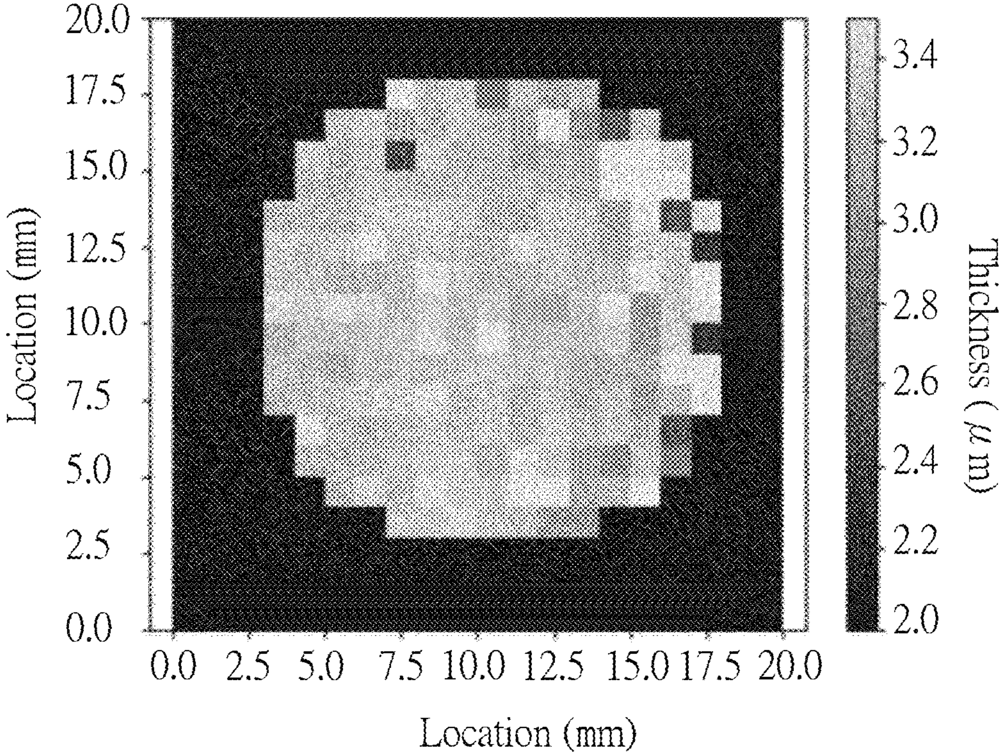
Figure 12A:
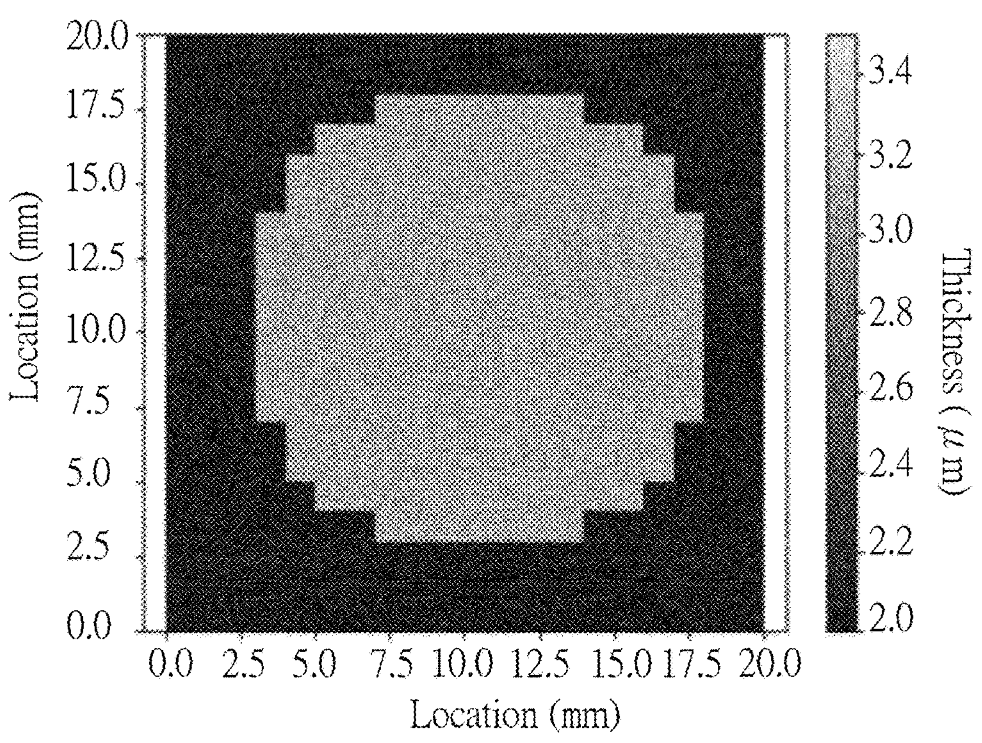
FIG. 12A, FIG. 12B and FIG. 12C are refractive index distribution charts of a second wafer.
Figure 12B:
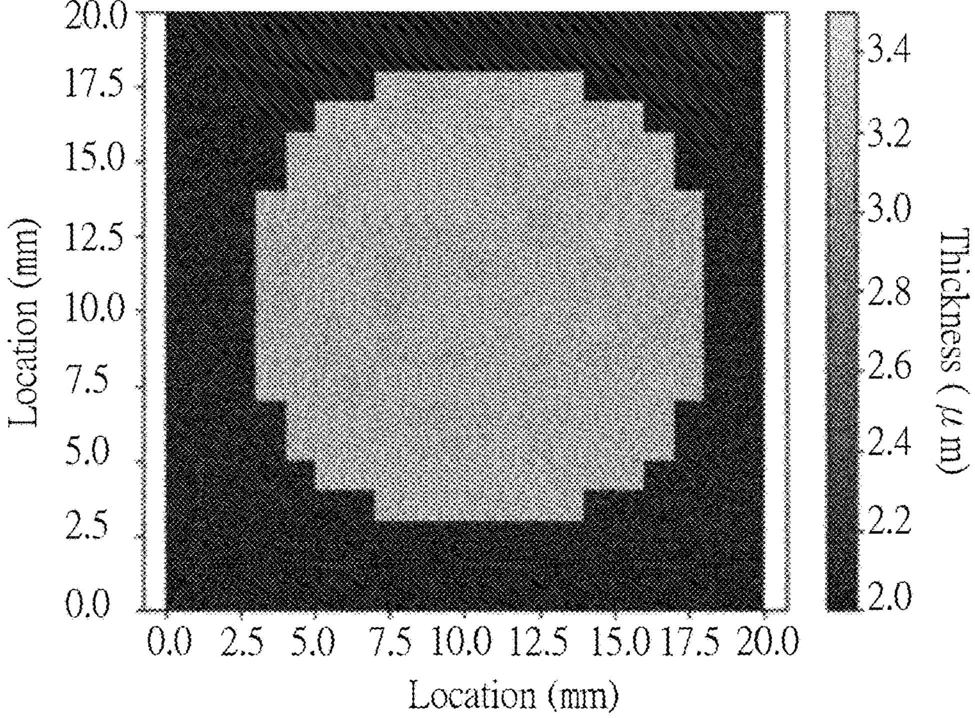
Figure 12C:
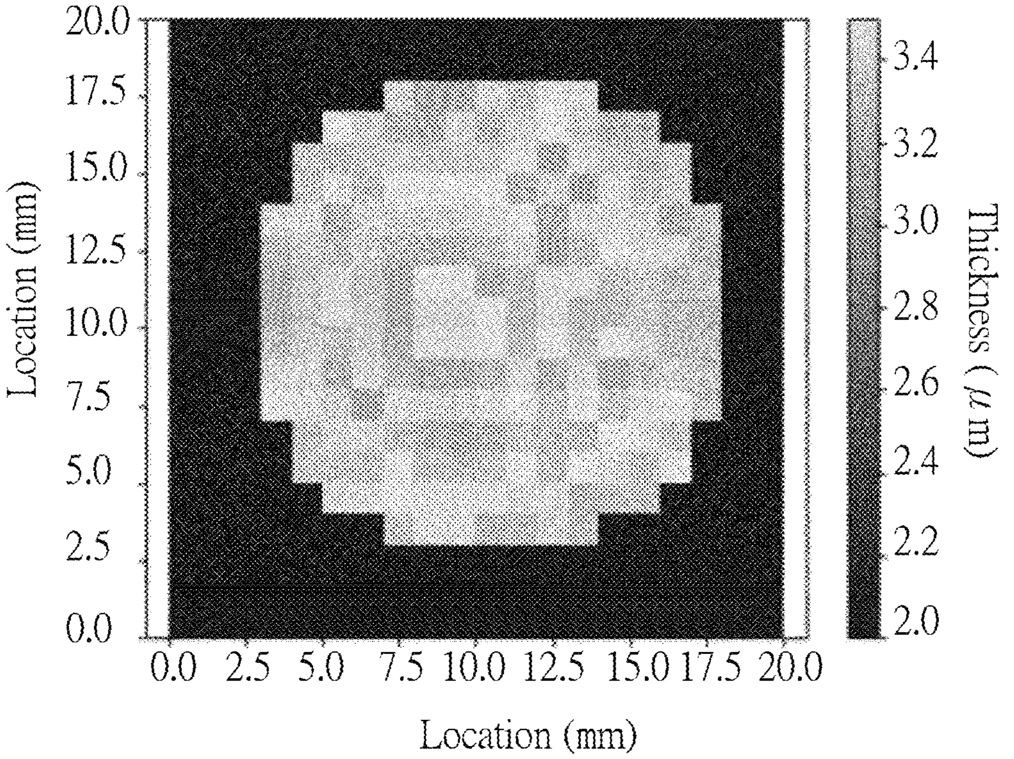

As can be seen from FIG. 11A to FIG. 11C and FIG. 12A to FIG. 12C, the refractive index distribution charts of the first wafer and the second wafer are all very uniform, and it is not easy to distinguish the differences between these two wafers. In this case, the present invention may further calculate the standard deviation of the refractive indices of the entire wafer of the first wafer and the second wafer. For example, the standard deviation of the refractive indices of FIG. 11A is 0.007, and the standard deviation of the refractive indices of FIG. 12A is 0.006, which are not significantly different; the standard deviation of the refractive indices of FIG. 11B is 0.026, and the standard deviation of the refractive indices of FIG. 12B is 0.027, which are slightly different; then, the standard deviation of the refractive indices of FIG. 11C is 0.19, and the standard deviation of the refractive indices of FIG. 12C is 0.09, where the former is 2.1 times the latter, so it can be inferred that there are more defects in the first wafer, which leads to greater inhomogeneity of the refractive index distribution in the shallow layer.

Therefore, through layered detection, the embodiments of the present invention may accurately analyze or compare the internal structure of the solid material and determine whether there are defects or provide a basis for judging defects.

Figure 13:
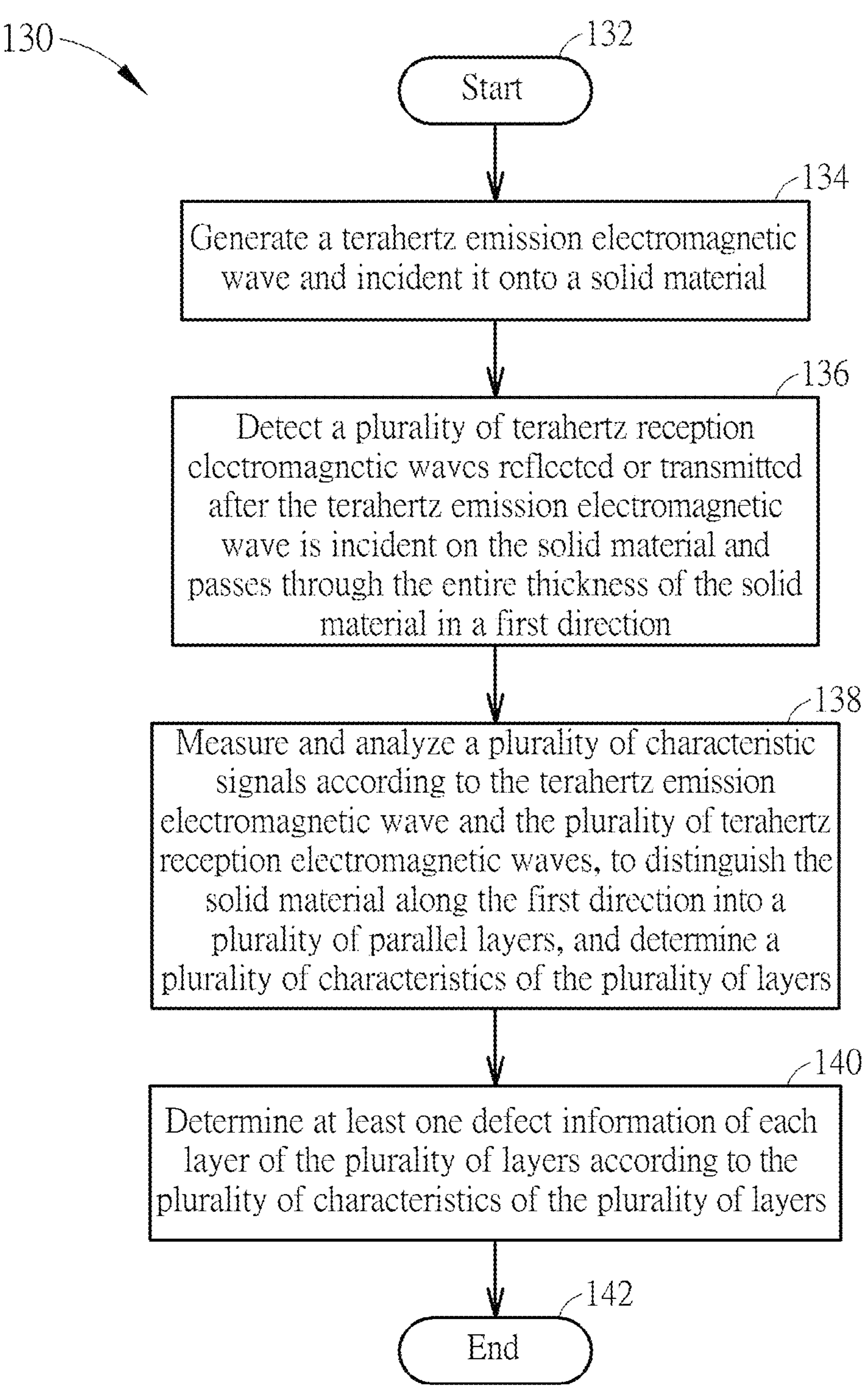
FIG. 13 is a schematic diagram of a layered detection process according to an embodiment of the present invention.

The above operation methods of the layered detection systems 1, 3, and 5 can be summarized into a layered detection process 130, as shown in FIG. 13. The layered detection process 130 is used to detect the solid material and includes the following steps:

Step 132: Start.

Step 134: Generate a terahertz emission electromagnetic wave and incident it onto a solid material.

Step 136: Detect a plurality of terahertz reception electromagnetic waves reflected or transmitted after the terahertz emission electromagnetic wave is incident on the solid material and passes through the entire thickness of the solid material in a first direction.

Step 138: Measure and analyze a plurality of characteristic signals according to the terahertz emission electromagnetic wave and the plurality of terahertz reception electromagnetic waves, to distinguish the solid material along the first direction into a plurality of parallel layers, and determine a plurality of characteristics of the plurality of layers.

Step 140: Determine at least one defect information of each layer of the plurality of layers according to the plurality of characteristics of the plurality of layers.

Step 142: End.

For the detailed description of the operation and variations of the layered detection process 130, please refer to the above description.

In the conventional techniques, when the material is not transparent to visible light, the completed structure cannot be inspected using visible light microscopy techniques, which may have defects such as differences in deposition layer thickness, residual internal defects, exposure misalignment coverage errors, and differences in material doping concentration. Even if the completed structure may undergo several tests, the resolution may be insufficient. In comparison, the present invention measures a plurality of characteristic signals based on the terahertz emission electromagnetic wave and a plurality of terahertz reception electromagnetic waves, and analyzes the plurality of characteristic signals to distinguish the solid material into a plurality of layers and determine a plurality of characteristics of each layer based on the plurality of characteristic signals. Since terahertz electromagnetic waves are penetrating to many materials, they can be used to detect the optical coefficient, electrical properties, layer thickness, or structural defects of different materials and structures in the board, and can also be used for process technical inspection, semi-finished product or finished product inspection. More importantly, through layered calculations, the present invention can accurately analyze or compare the internal structure of the solid material and determine whether there are defects or provide a basis for judging defects. Therefore, the present invention can realize non-contact non-destructive and detection of non-transparent solid materials, and can improve the detection resolution through layered detection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A layered detection method, comprising:

generating a terahertz emission electromagnetic wave, and emitting the terahertz emission electromagnetic wave at any angle to a solid material;

detecting a plurality of terahertz emission electromagnetic waves reflected or transmitted after the terahertz emission electromagnetic wave is incident on the solid material and passes through an entire thickness of the solid material in a first direction;

measuring and analyzing a plurality of characteristic signals according to the terahertz emission electromagnetic wave and the plurality of terahertz reception electromagnetic waves, defining a specific depth in the solid material as an interface, obtaining an electric field intensity of an incident electromagnetic wave and a reflected or transmitted electromagnetic wave corresponding to the interface and an angle formed with a normal to the interface, and calculating complex refractive indices on both sides of the interface by using Fresnel equations, so as to distinguish the solid material along the first direction into a plurality of parallel layers, and determine a plurality of characteristics of the plurality of layers; and determining at least one defect information of each layer of the plurality of layers according to the plurality of characteristics of the plurality of layers.

2. The layered detection method of claim 1, wherein a frequency of the terahertz emission electromagnetic wave is between $10^{11}$ Hz and $10^{13}$ Hz.

3. The layered detection method of claim 1, wherein the plurality of characteristic signals comprise an electric field intensity, an electric field frequency and an electric field phase of each of the plurality of terahertz reception electromagnetic waves.

4. The layered detection method of claim 3, wherein the plurality of characteristic signals further comprise at least one spectral electric field between the plurality of terahertz reception electromagnetic waves, and each spectral electric field comprises an electric field amplitude, an electric field phase, and an electric field polarization.

5. The layered detection method of claim 1, wherein the plurality of characteristics comprise at least one of an electrical coefficient and an optical coefficient of each of the plurality of layers.

6. The layered detection method of claim 5, wherein the electrical coefficient is at least one of a conductivity, a resistivity, a doping concentration, a dielectric constant and a charge carrier mobility, and the optical coefficient is at least one of an absorptance, a refractive index, a reflectivity and a transmittance.

7. The layered detection method of claim 1, wherein the solid material is selected from one or more of a semiconductor wafer, a ceramic material, and a polymer material.

8. The layered detection method of claim 7, wherein the semiconductor wafer is at least one of a silicon wafer (Si), a germanium wafer (Ge), a silicon carbide (Sic), a gallium arsenide (GaAs), a gallium nitride (GaN), a gallium phosphide (GaP), a cadmium sulfide (Cds), an indium phosphide (InP), a zinc oxide (ZnO), a gallium oxide ($Ga_2O_3$), and an aluminum nitride (AlN).

9. The layered detection method of claim 1, wherein the at least one detect information is at least one information of material inhomogeneity, bubbles or porosity, uneven mixing of multiple materials, residual stress, crystal dislocation, uneven doping concentration.

10. The layered detection method of claim 1, wherein the first direction is normal to at least one interface between the plurality of layers.

11. A layered detection system, comprising:

a terahertz electromagnetic wave generator, configured to generate a terahertz emission electromagnetic wave, and emit the terahertz emission electromagnetic wave at any angle to a solid material;

a terahertz electromagnetic wave receiver, configured to detect a plurality of terahertz emission electromagnetic waves reflected or transmitted after the terahertz emission electromagnetic wave is incident on the solid material and passes through an entire thickness of the solid material in a first direction; and a detection device, coupled to the terahertz electromagnetic wave generator and the terahertz electromagnetic wave receiver, configured to measure and analyze a plurality of characteristic signals according to the terahertz emission electromagnetic wave and the plurality of terahertz reception electromagnetic waves, define a specific depth in the solid material as an interface, obtain an electric field intensity of an incident electromagnetic wave and a reflected or transmitted electromagnetic wave corresponding to the interface and an angle formed with a normal to the interface, and calculate complex refractive indices on both sides of the interface by using Fresnel equations, so as to distinguish the solid material along the first direction into a plurality of parallel layers, and determine a plurality of characteristics of the plurality of layers, and to determine at least one defect information of each layer of the plurality of layers according to the plurality of characteristics of the plurality of layers.

12. The layered detection system of claim 11, wherein a frequency of the terahertz emission electromagnetic wave is between $10^{11}$ Hz and $10^{13}$ Hz.

13. The layered detection system of claim 11, wherein the plurality of characteristic signals comprise an electric field intensity, an electric field frequency and an electric field phase of each of the plurality of terahertz reception electromagnetic waves.

14. The layered detection system of claim 13, wherein the plurality of characteristic signals further comprise at least one spectral electric field between the plurality of terahertz reception electromagnetic waves, and each spectral electric field comprises an electric field amplitude, an electric field phase, and an electric field polarization.

15. The layered detection system of claim 11, wherein the plurality of characteristics comprise at least one of an electrical coefficient and an optical coefficient of each of the plurality of layers.

16. The layered detection system of claim 15, wherein the electrical coefficient is at least one of a conductivity, a resistivity, a doping concentration, a dielectric constant and a charge carrier mobility, and the optical coefficient is at least one of an absorptance, a refractive index, a reflectivity and a transmittance.

17. The layered detection system of claim 11, wherein the solid material is selected from one or more of a semiconductor wafer, a ceramic material, and a polymer material.

18. The layered detection system of claim 17, wherein the semiconductor wafer is at least one of a silicon wafer (Si), a germanium wafer (Ge), a silicon carbide (SiC), a gallium arsenide (GaAs), a gallium nitride (GaN), a gallium phosphide (GaP), a cadmium sulfide (CdS), an indium phosphide (InP), a zinc oxide (ZnO), a gallium oxide ($Ga_2O_3$), and an aluminum nitride (AlN).

19. The layered detection system of claim 11, wherein the at least one detect information is at least one information of material inhomogeneity, bubbles or porosity, uneven mixing of multiple materials, residual stress, crystal dislocation, uneven doping concentration.

20. The layered detection system of claim 11, wherein the first direction is normal to at least one interface between the plurality of layers.

* * * * *